United States Patent [19]

Manico

[11] Patent Number: 5,580,011
[45] Date of Patent: Dec. 3, 1996

[54] FILM SPOOL WITH BUILT-IN AUDIBLE INDICATOR FOR VERIFYING FILM LOADING IN A CAMERA

[75] Inventor: Joseph A. Manico, Rochester, N.Y.

[73] Assignee: Eastman Kodak Company, Rochester, N.Y.

[21] Appl. No.: 449,032

[22] Filed: May 24, 1995

[51] Int. Cl.$^6$ ................................................. G03B 17/26
[52] U.S. Cl. .......................... 242/348; 396/283; 396/284; 396/512
[58] Field of Search .................... 242/348, 348.1, 242/348.3; 352/78 R; 354/275

[56] References Cited

U.S. PATENT DOCUMENTS

| | | |
|---|---|---|
| 3,735,682 | 5/1973 | Kamp et al. . |
| 3,831,881 | 8/1974 | Tucker . |
| 5,032,854 | 7/1991 | Smart et al. ............................. 354/275 |
| 5,274,412 | 12/1993 | Stoneham et al. ...................... 354/275 |
| 5,404,188 | 4/1995 | Takahashi et al. ...................... 354/275 |

FOREIGN PATENT DOCUMENTS

| | | | |
|---|---|---|---|
| 3-167537 | 7/1991 | Japan | .................................... 354/275 |
| 4-324432 | 11/1992 | Japan | .................................... 354/275 |
| 4-350633 | 12/1992 | Japan | .................................... 354/275 |
| 6-123912 | 5/1994 | Japan | .................................... 354/275 |

Primary Examiner—John P. Darling
Attorney, Agent, or Firm—Roger A. Fields

[57] ABSTRACT

A film spool has a film-unwound verifier that produces an audible indication that a particular length of a filmstrip has been unwound from the spool.

6 Claims, 3 Drawing Sheets

FILM SPOOL WITH BUILT-IN AUDIBLE INDICATOR FOR VERIFYING FILM LOADING IN A CAMERA

FIELD OF THE INVENTION

The invention relates generally to the field of photography, and in particular to a film spool with a built-in audible indicator for verifying film loading in a camera for example.

BACKGROUND OF THE INVENTION

To load most 35 mm cameras, a film cartridge is inserted in a loading chamber of the camera and the forward end portion of a film leader protruding from a light-trapping slit in the cartridge is placed over a take-up spool in the camera. In some cameras, the forward end portion of the film leader is manually attached to the take-up spool before a rear door of the camera is closed. Then, a film loading or winding operation is performed, for example, by manually pivoting a winding lever for the take-up spool and manually depressing a shutter release button several times. This is done until the entire leader is unwound from a supply spool inside the cartridge and is wound onto the take-up spool, and the first-available film frame is positioned for exposure. In other cameras, the forward end portion of the film leader is automatically secured to the take-up spool at the beginning of the film loading operation. As the take-up spool is rotated via a motor drive, for example, one or more circumferential teeth of the spool engage the forward end portion of the film leader at its perforations to wind the leader onto the spool and position the first-available film frame for exposure. A spring-like deflector or other suitable means may be provided on the rear door of the camera for pressing the film leader against the take-up spool to facilitate engagement of the forward end portion of the leader by the circumferential teeth of the spool.

A problem that exists in some 35 mm cameras is that even though the photographer believes the forward end portion of the film leader is secured to the take-up spool, the forward end portion may fail to be engaged with the spool or may become disengaged from the spool during the film loading operation. As a result, the film leader will not be wound onto the take-up spool and the first-available film frame cannot be positioned for exposure. However, since the rear door of the camera is closed, the photographer may not be aware of the malfunction.

SUMMARY OF THE INVENTION

A film spool comprising:

a film roll support rotatable to unwind a filmstrip, beginning with a film leader having several frame lengths, from the film roll support; and audible verifier means for providing an audible indication only when the film roll support is rotated a sufficient number of revolutions for at least the film leader of the filmstrip to be unwound from the film roll support, whereby the audio indication will verify that enough of the filmstrip has been unwound from the film roll support to achieve film loading in a camera.

DETAILED DESCRIPTION OF THE INVENTION

The invention is disclosed as being embodied preferably in a film cartridge. Because the features of a film cartridge are generally known, the description which follows is directed in particular only to those elements forming part of or cooperating directly with the disclosed embodiment. It is to be understood, however, that other elements may take various forms known to a person of ordinary skill in the art.

Figure 1:
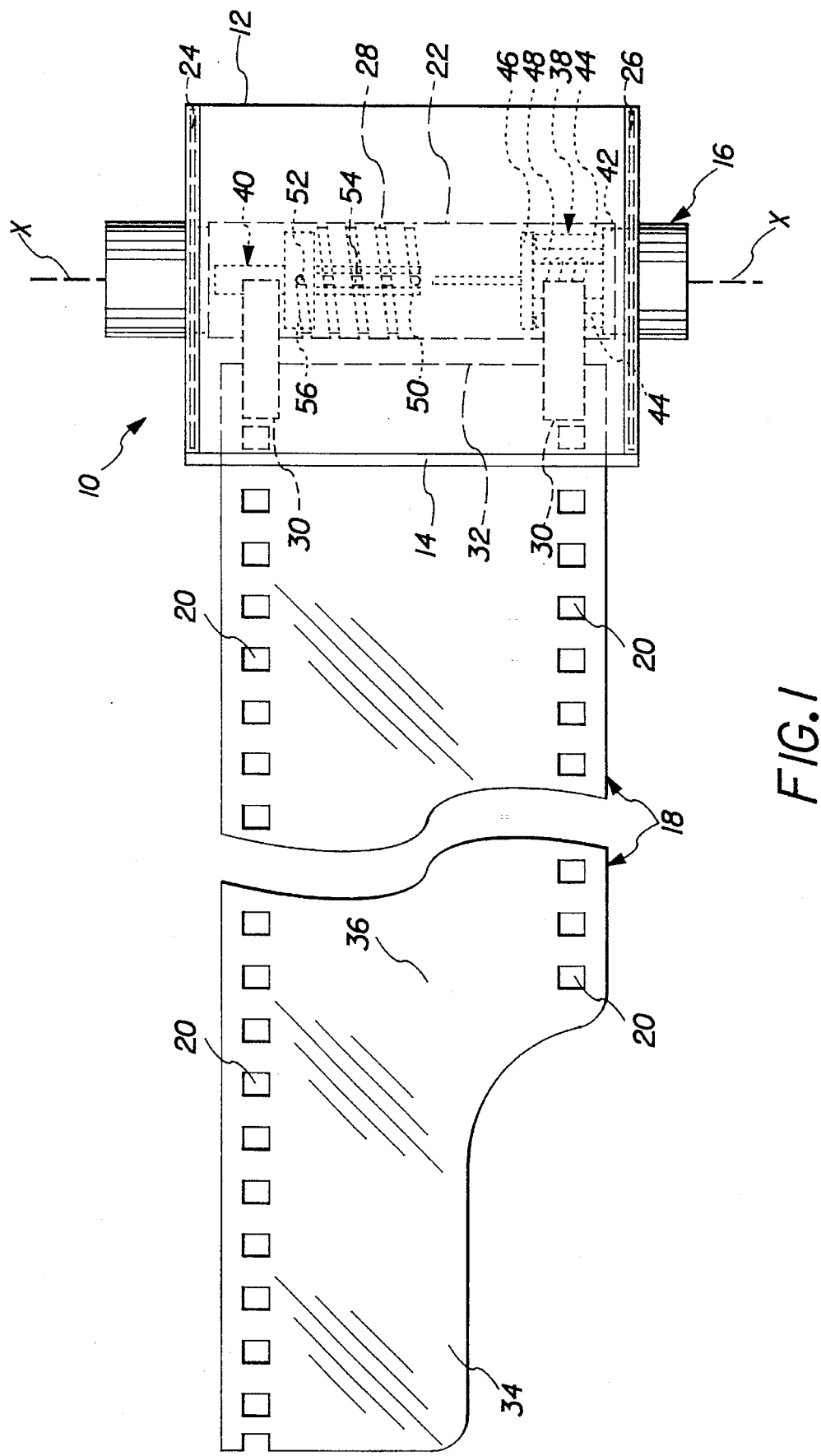
FIG. 1 is an elevation view of a film cartridge including a film spool with an audible indicator for verifying film loading in a camera, according to a preferred embodiment of the invention.

Referring now to the drawings, FIG. 1 depicts a film cartridge 10 comprising a known cartridge shell or housing 12 with a light-trapping film egress/film ingress slit 14 and a film spool 16 supported inside the cartridge shell for rotation about an axis X. A known 35 mm filmstrip 18 having respective edge perforations 20 is coiled about a hollow, open-end, cylindrical, film roll support 22 between a pair of disk-like end flanges 24 and 26. The pair of flanges 24 and 26 are fixed to a hollow, cylindrical, spool core 28 which coaxially extends inside the film roll support 22. Two pieces of adhesive tape 30 secure an inner end portion 32 of the filmstrip 18 to the film roll support 22. A forward end portion 34 of a film leader 36 of the filmstrip 18 originally protrudes from the slit 14. The film leader 36 is several (3–4) frame lengths long.

Figure 3:
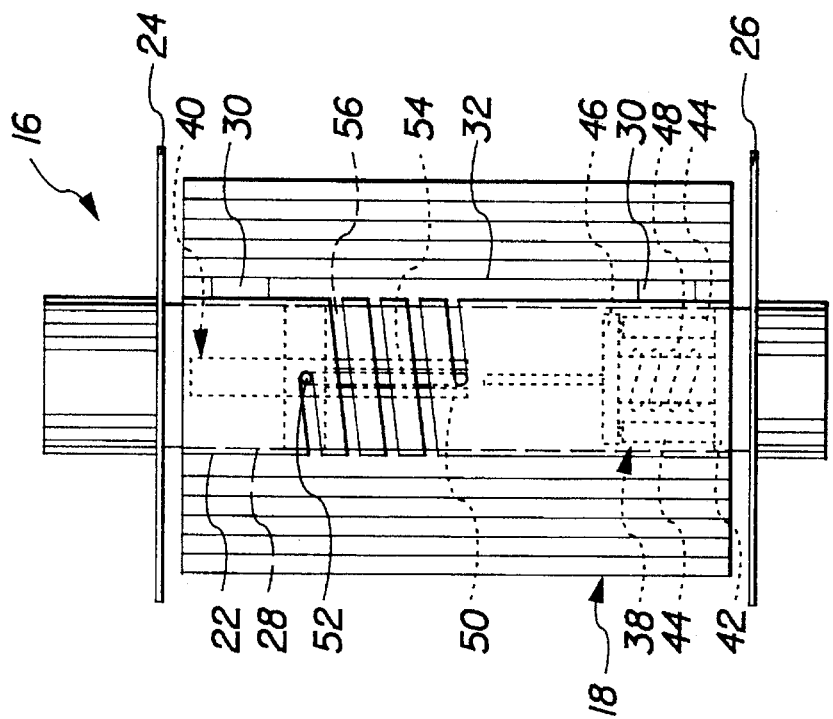
FIG. 3 is an elevation view of the film spool, showing the audio indicator after being used.
Figure 2:
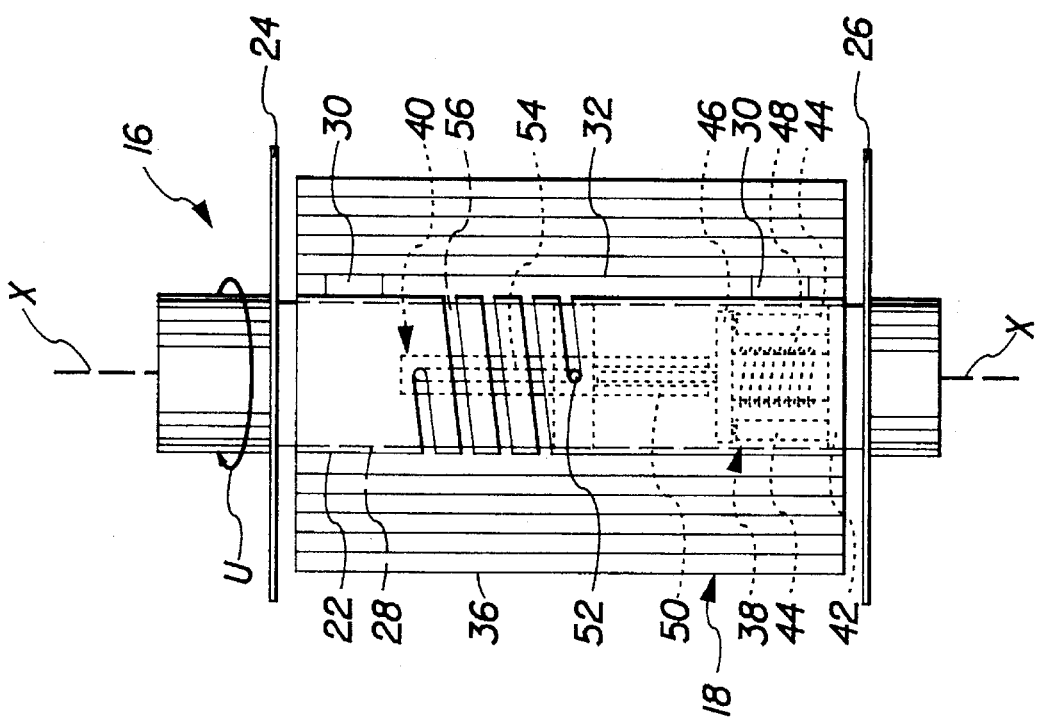
FIG. 2 is an elevation view of the film spool, showing the audio indicator ready for use.
Figure 4:
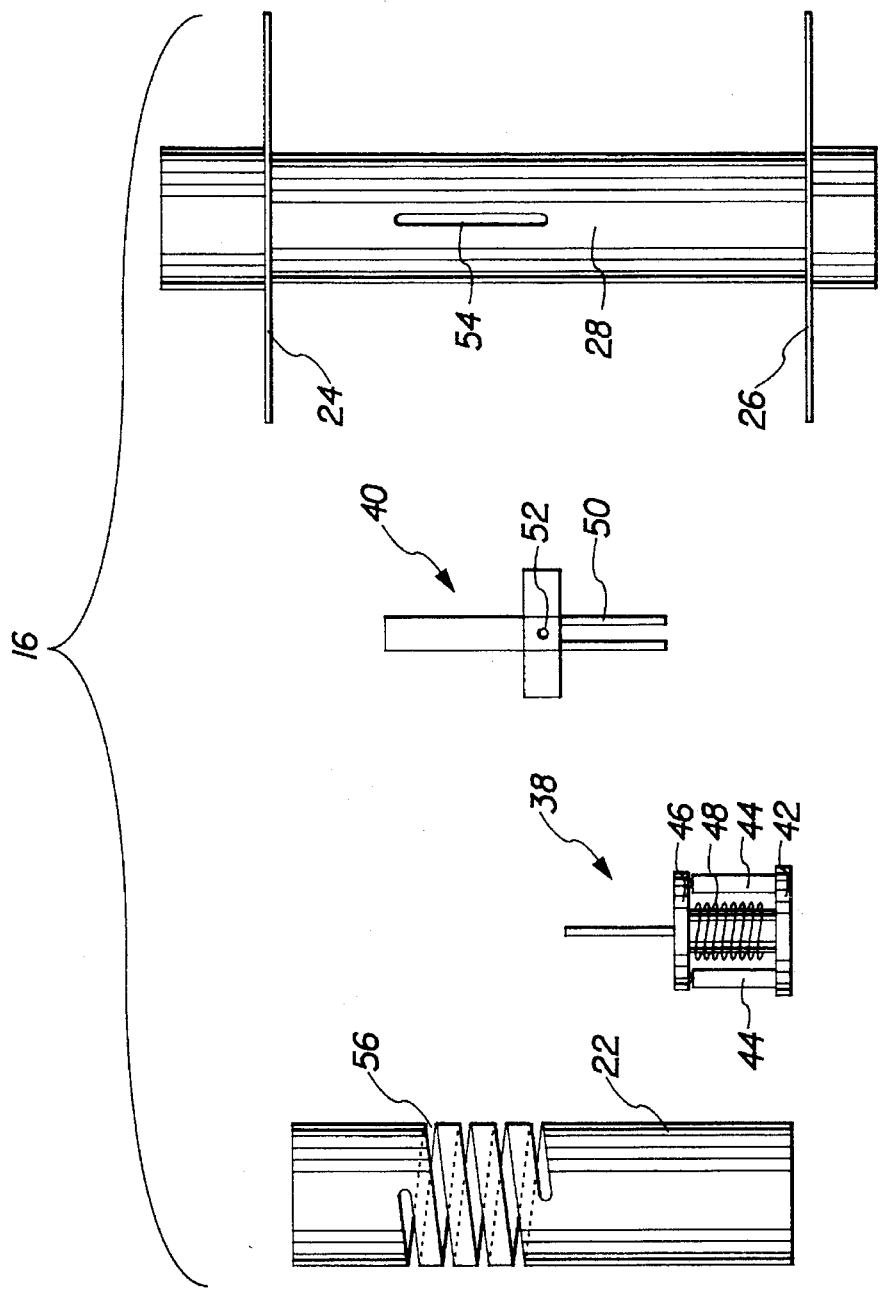
FIG. 4 is an exploded elevation view of the film spool.

The film spool 16 in addition to the coaxial film roll support 22 and the coaxial spool core 28, as shown in FIGS. 2 and 4, includes a sound generating mechanism 38 and a trigger device 40 located inside the spool core. The sound generating mechanism 38 has a base 42 with a pair of identical metal tines 44 fixed to the flange 26 and a striker 46 rotatably supported via the base. A torsion spring 48 is originally tensioned to rotate the striker periodically into contact with the pair of tines 44 to produce a chirping or ringing sound. See FIGS. 2 and 3. The trigger device 40 has a forked end 50 normally in engagement with the striker 46. A cam follower pin 52 projects from the trigger device 40 through a motion-constraining slot 54 in the spool core 28 into a helical cam slot 56 in the film roll support 22. Location of the cam follower pin 52 in the motion-constraining slot 54 serves to prevent the striker 46 from being rotated by the torsion spring 48 as long as the forked end 50 of the trigger device 40 remains in engagement with the striker. See FIG. 2. However, when the forked end 50 is disengaged from the striker 46, the torsion spring 48 rotates the striker. See FIG. 3.

Operation

When the film leader 18 is pulled out of the cartridge shell 12 though the light-trapping slit 14, such as during film loading in a camera, the film roll support 22 is rotated about the axis X relative to the spool core 28 in a film unwinding direction U. See FIG. 2. As a result, the helical cam slot 56 drives the cam follower pin 52 from one end of the cam slot to an opposite end of the cam slot to, in turn, translate the cam follower pin from one end of the motion-constraining slot 54 to an opposite end of the motion-constraining slot. This makes the forked end 50 of the trigger device 40 disengage from the striker 46, permitting the torsion spring 48 to rotate the striker to produce the chirping or ringing sound. See FIG. 3. The chirping or ringing sound serves as an audible verification that enough of the filmstrip 18 has been removed from the cartridge shell 12 to achieve film loading in the camera.

Once the cam follower pin 52 is moved to the opposite ends of the motion-constraining slot 54 and the helical cam slot 56 as shown in FIG. 3, the cam follower pin causes the spool core 28 to be rotated with the film roll support 22 about the axis X in the film unwinding direction U when further lengths of the filmstrip 18 are pulled out of the cartridge shell 12 through the light-trapping slit 14.

Alternative Embodiment

Figure 5:
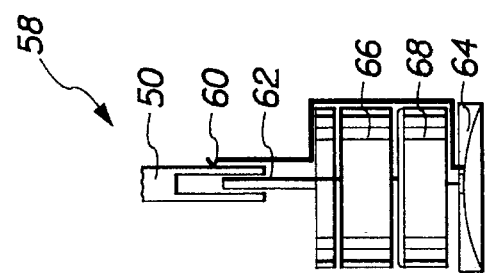
FIG. 5 is an elevation view of an alternative embodiment of the audio indicator.

FIG. 5 depicts an alternative embodiment 58 of the sound generating mechanism 38. Specifically, the alternative embodiment 58 comprises a pair of resilient switch contacts 60 and 62 which are normally held apart by the forked end 50 of the trigger device 40, a piezoelectric speaker 64, a tone generating amplifier 66, and a battery 68. When the forked end 50 is removed from between the switch contacts 60 and 62, the switch contacts spring against one another to close an electrical circuit in order for the tone generating amplifier 66 to provide a continuous tone to the speaker 66 via the battery 68.

The invention has been described with reference to a preferred embodiment. However, it will be appreciated that variations and modifications can be effected by a person of ordinary skill in the art without departing from the scope of the invention.

PARTS LIST 10. film cartridge
12. cartridge shell
14. light-trapping film egress/ingress slit
16. film spool
X. axis
18. filmstrip
20. edge perforations
22. film roll support
24. end flange
26. end flange
28. spool core
30. adhesive tape
32. inner film end portion
34. forward leader end portion
36. film leader
38. sound generating mechanism
40. trigger device
42. base
44. metal tines
46. striker
48. torsion spring
50. forked trigger end
52. cam follower pin
54. motion-constraining slot
56. helical cam slot
U. film unwinding direction
58. alternative embodiment
60. switch contact
62. switch contact
64. speaker
66. tone generating amplifier
68. battery

I claim:

1. A film spool comprising:

a film roll support rotatable to unwind a filmstrip, beginning with a film leader having several frame lengths, from said film roll support; and audible verifier means for providing an audible indication only when said film roll support is rotated a sufficient number of revolutions for at least the film leader of the filmstrip to be unwound from the film roll support, whereby the audio indication will verify that enough of the filmstrip has been unwound from said film roll support to achieve film loading in a camera.

2. A film spool comprising:

a hollow spool core;

sound generating means inside said spool core for producing an audible indication; and film roll supporting means encircling said spool core for rotation relative to the spool core for causing said sound generating means to produce its audible indication responsive to rotation of said film roll supporting means.

3. A film spool as recited in claim 2, wherein said film roll supporting means is rotatable in a film unwinding direction to begin to unwind a filmstrip from the film roll supporting means and causes said sound generating means to produce the audible indication responsive to rotation of the film roll supporting means in the film unwinding direction.

4. A film spool comprising:

sound generating means biased for producing an audible indication;

trigger means disengageable from said sound generating means for permitting the sound generating means to produce the audible indication;

film roll supporting means rotatable in a film unwinding direction for unwinding a filmstrip from said film roll supporting means; and cooperating means on said film roll supporting means and said trigger means for disengaging the trigger means from said sound generating means responsive to rotation of the film roll supporting means in the film unwinding direction, whereby the audible indication can verify that a filmstrip has at least been partially unwound from said film roll supporting means.

5. A film spool comprising:

a hollow spool core;

sound generating means inside said spool core biased for producing an audible indication;

trigger means disengageable from said sound generating means for permitting the sound generating means to produce the audible indication;

film roll supporting means encircling said spool core for rotation relative to the spool core to begin to unwind a filmstrip from said film roll supporting means; and cooperating means on said film roll supporting means, said trigger means, and said spool core for disengaging the trigger means from said sound generating means responsive to rotation of the film roll supporting means relative to the spool core and for making the spool core rotate with the film roll supporting means responsive to disengagement of the trigger means from the sound generating means.

6. A film spool as recited in claim 5, wherein said cooperating means includes a motion-constraining slot in said spool core, a helical cam slot in said film roll supporting means, and a cam follower pin projecting from said trigger means though said motion-constraining slot into said helical cam slot to disengage the trigger means from said sound generating means when said film roll supporting means is rotated and to make said spool core rotate with the film roll supporting means when the trigger means is disengaged from the sound generating means.

* * * * *